(12) United States Patent
Vo

(10) Patent No.: US 10,500,818 B2
(45) Date of Patent: Dec. 10, 2019

(54) MODULAR ELEMENT FOR A THERMALLY INSULATED CONSTRUCTION AND A CONSTRUCTION COMPRISING SUCH MODULAR ELEMENTS

(71) Applicant: Ltv.Stål, Hørning (DK)

(72) Inventor: Lan Trung Vo, Hørning (DK)

(73) Assignee: LTV.STÅL, Hørning (DK)

( * ) Notice: Subject to any disclaimer, the term of this patent is extended or adjusted under 35 U.S.C. 154(b) by 0 days.

(21) Appl. No.: 15/352,747

(22) Filed: Nov. 16, 2016

(65) Prior Publication Data
US 2017/0182742 A1 Jun. 29, 2017

(30) Foreign Application Priority Data
Dec. 23, 2015 (EP) .................................... 15202299

(51) Int. Cl.
| | |
|---|---|
| *B32B 15/04* | (2006.01) |
| *B32B 7/05* | (2019.01) |
| *B23K 31/02* | (2006.01) |
| *B32B 3/28* | (2006.01) |
| *B32B 5/20* | (2006.01) |
| *B32B 15/18* | (2006.01) |

(52) U.S. Cl.
CPC ............ *B32B 15/046* (2013.01); *B23K 31/02* (2013.01); *B32B 3/28* (2013.01); *B32B 5/20* (2013.01); *B32B 7/05* (2019.01); *B32B 15/043* (2013.01); *B32B 15/18* (2013.01); *B32B 2266/0278* (2013.01); *B32B 2307/304* (2013.01); *B32B 2509/10* (2013.01)

(58) Field of Classification Search
CPC ..... B32B 15/046; B32B 15/043; B32B 7/045; B32B 5/20; B32B 3/28; B32B 15/18; B32B 2509/10; B32B 2307/304; B23K 31/02

USPC ........................ 52/287.1, 290; 312/46–407.1
See application file for complete search history.

(56) References Cited

U.S. PATENT DOCUMENTS

| | | | | |
|---|---|---|---|---|
| 3,472,570 A | | 10/1969 | Moran | |
| 3,923,355 A | * | 12/1975 | Dietterich | ............... F25D 23/06 312/406.1 |
| 4,005,919 A | * | 2/1977 | Hoge | ..................... B32B 27/00 312/406 |
| 4,006,947 A | * | 2/1977 | Haag | .................. B65D 81/3823 312/406 |

(Continued)

OTHER PUBLICATIONS

European Search Report; Application No. EP 15 20 2299; Place of Search: The Hague; dated May 25, 2016.

*Primary Examiner* — Brian E Glessner
*Assistant Examiner* — Adam G Barlow
(74) *Attorney, Agent, or Firm* — Blank Rome LLP

(57) ABSTRACT

A modular element for a thermally insulated construction such as a freezer construction or a heated construction, wherein the modular element is a thermally insulated structural element comprising an inner cladding, an outer cladding and an insulating layer located between the inner cladding and the outer cladding. The modular element is configured with the insulating layer placed adjacent to the inner cladding prior to assembly of said modular element in a modular construction. Further, the inner cladding of the modular element is adapted to be joined to an inner cladding of the modular construction along at least a substantial part of at least one edge with the insulating layer of the modular element maintained intact.

16 Claims, 7 Drawing Sheets

(56) References Cited

U.S. PATENT DOCUMENTS

Figure 1:
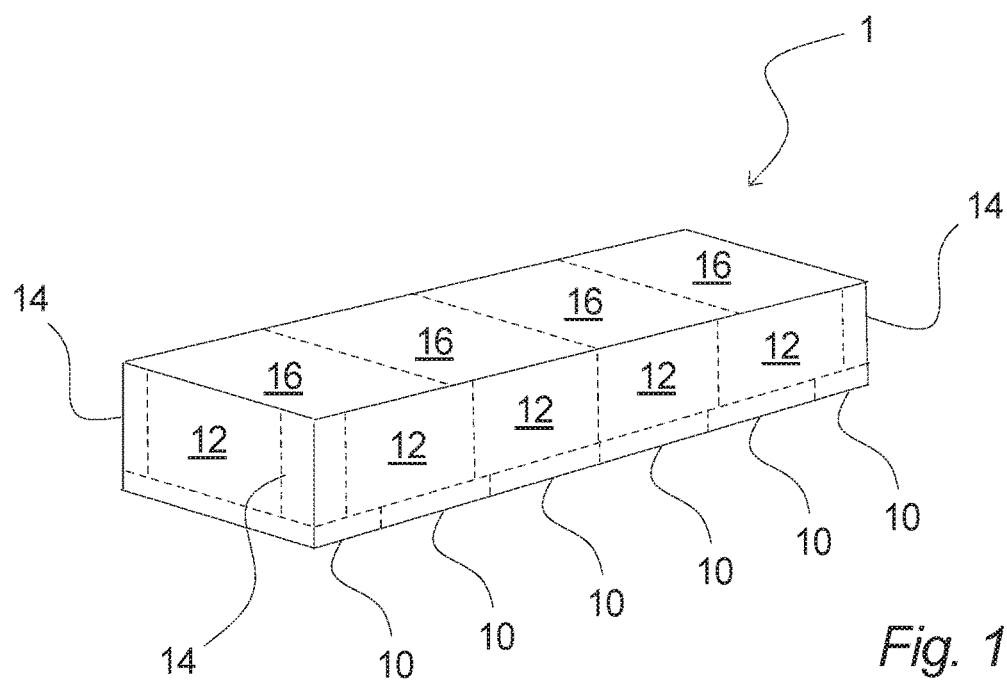

| | | | | |
|---|---|---|---|---|
| 4,360,553 A * | 11/1982 | Landheer | E04C 2/292 | 428/45 |
| T104,002 I4 * | 3/1984 | Morrison | H02B 1/30 | 312/257.1 |
| 4,698,278 A * | 10/1987 | Prang | B32B 15/08 | 428/314.4 |
| 4,907,419 A * | 3/1990 | Kruck | F25D 11/00 | 62/263 |
| 4,917,256 A * | 4/1990 | Kruck | B29C 44/146 | 206/545 |
| 5,007,246 A * | 4/1991 | Kruck | F25D 11/00 | 200/61.7 |
| 5,009,952 A * | 4/1991 | Klepsch | B29C 44/065 | 428/319.1 |
| 5,168,621 A * | 12/1992 | Kruck | A47L 15/4251 | 264/515 |
| 5,269,602 A * | 12/1993 | Kuwahara | F25D 23/064 | 220/614 |
| 5,424,118 A * | 6/1995 | McLaughlin | E04B 1/6183 | 428/314.8 |
| 5,448,865 A * | 9/1995 | Palmersten | E04B 1/6129 | 52/309.9 |
| 5,476,318 A * | 12/1995 | Yingst | E05B 1/0015 | 312/405 |
| 6,055,823 A * | 5/2000 | Baker | F25D 17/065 | 62/265 |
| 6,305,768 B1 * | 10/2001 | Nishimoto | B29C 44/1242 | 220/592.09 |
| 6,460,955 B1 * | 10/2002 | Vaughan | B29C 51/267 | 312/236 |
| 7,677,681 B2 * | 3/2010 | Cheon | F25D 23/066 | 220/62.17 |
| 8,833,019 B2 * | 9/2014 | Rutherford | E04F 13/06 | 52/288.1 |
| 9,010,046 B1 * | 4/2015 | Reilly | B44C 7/022 | 160/327 |
| 9,310,123 B2 * | 4/2016 | Guarino | F25D 23/02 | |
| 2005/0235682 A1 * | 10/2005 | Hirai | F25D 23/062 | 62/440 |
| 2008/0245006 A1 * | 10/2008 | Rachak | E04F 19/04 | 52/287.1 |
| 2009/0038335 A1 * | 2/2009 | Sonnenfroh | F25D 23/062 | 62/447 |
| 2009/0044558 A1 * | 2/2009 | Hell | F25D 19/00 | 62/298 |
| 2009/0056367 A1 * | 3/2009 | Neumann | F25D 23/063 | 62/449 |
| 2009/0317586 A1 * | 12/2009 | Feinauer | E04B 1/803 | 428/117 |
| 2010/0287974 A1 * | 11/2010 | Cur | F25D 23/063 | 62/449 |
| 2011/0146054 A1 | 6/2011 | Selin et al. | | |
| 2016/0215997 A1 * | 7/2016 | Carlyon | B32B 5/20 | |
| 2017/0144412 A1 * | 5/2017 | Wu | F25D 23/065 | |

\* cited by examiner

MODULAR ELEMENT FOR A THERMALLY INSULATED CONSTRUCTION AND A CONSTRUCTION COMPRISING SUCH MODULAR ELEMENTS

CROSS-REFERENCES TO RELATED APPLICATIONS

This application claims the benefit of priority to European Patent Application No. 15202299.2 filed on Dec. 23, 2015, the entire disclosure of which is incorporated herein by reference.

FIELD OF THE INVENTION

The invention relates to an element for insulated constructions such as thermally insulated housings, etc. which are being used for e.g. cooling, freezing, warming, heating, etc. of products such as food products.

The invention further relates to a construction, e.g. a thermally insulated housing, house, tunnel, etc. comprising such one or more elements.

BACKGROUND OF THE INVENTION

Thermally insulated constructions are used for example in the form of a freezer house, wherein consumer ice cream products are being frozen, the process of which has been a widespread and well-known process for many years. In such a process, the ice cream products are placed on a series of product plates that are conveyed by means of a chain conveyor in a rack. During the process time, e.g. the time that it takes for an ice cream product to be conveyed through the freezer house, which time may be variable but as an example may be 25 minutes, cold air having a temperature of circa minus 40° C. is blown over the products, which thereby are being cooled and frozen. The cold air is provided by means of a refrigerator arrangement, which has evaporators placed inside the freezer house, where a refrigerant fluid flows through the evaporators and where fans are blowing air over the evaporators.

Such a freezer house is usually built having an insulated floor, insulated walls, an insulated ceiling and one or more insulated doors. The outer side of the house can be covered by plates of stainless steel, of painted steel or plastic plates. Often, the outer side of the house is integrated in the elements that make up floor, the walls and the ceiling as the elements may be prefabricated panels.

The freezer houses may vary in size from small houses with dimensions of a few meters to large houses having a length and width of more than 10 meter and with a considerable height. Decisive for the size and the ratio between length, width and height are both the need and/or desire for a certain capacity and consideration of the floor space that is available.

Freezer houses may be designed at least partly with stainless steel inner cladding. In a simple design of such a freezer house only a bottom tray is made of stainless steel, which bottom tray covers the floor and reaches a small distance up along the sides of the freezer house.

Where high demands are made as regards food product safety, a stainless steel inner cladding is used. The stainless steel inner cladding can cover floor, walls and ceiling and can be made with continuous welding, e.g. seam welding of the joints to make up a completely closed unit. Thus, it is avoided that water and product residues may contact the insulating material, which otherwise would represent a risk of resulting undesired growth of bacteria or growth of other undesired matter. Furthermore, the cleaning procedure and subsequent drying of the freezer house is thereby simplified.

However, such prior art freezing houses and freezing constructions are associated with a number of drawbacks and disadvantages. For example, a normally used method of fabricating the freezer houses with stainless steel inner cladding comprises fabricating elements for the house, e.g. the outer parts for the house, and elements for the inner cladding separately and assembling these at the site. Such a prior art method is characteristic in that the setting up of a freezer house demands both considerable time and resources in that a relatively large number of working hours is required. In addition to this, such a prior art method causes that the product manufacturer, e.g. a consumer ice cream manufacturer, must accept that the production area is not usable while the setting up is performed. Also in the setting up period other disadvantages follow in connection with special shielding and cleaning processes, which are required in order to ensure the food product safety in production areas in the vicinity of the setting up area.

The setting up or erecting includes a number of very difficult sub-processes as regards craftsmanship and often the quality of the house as such deviates from the ideal quality as regards such issues as evenness of the bottom tray, finish of welding, etc. Other flaws which may primarily be of cosmetic character will also result from such a setting up that is performed at the actual site. Lack of evenness of the bottom tray can cause a lack of comfort when walking on the bottom tray and furthermore a more difficult draining after wash since the water will remain in puddles on the bottom tray. Often, it will not be possible to achieve the specified evenness in such prior art processes, which thereby requires that a compromise must be settled between the builder of the freezer house and the customer.

Even further, in connection with a part of prior art designs there is a risk of melting a part of the insulating material during the welding processes, when setting up the construction. Aside from the immediate fire risk that is caused, such a melting of the insulating material will also provide continuous problems with reduced insulating capability and undesired voids in the insulation. Such undesired voids in the insulation material will cause a subsequent risk of fluid accumulation in the insulation and further damage to the insulation caused by freezing of the fluid.

An example of a prior art insulated freezer tunnel construction is disclosed in U.S. Pat. No. 3,472,570, which relates to a modular construction. This document describes for example a construction, where stainless steel inner skin plates are welded together to form a channel-shaped inside jacket and where stainless steel outer skin plates are welded together to form a channel-shaped outside jacket. During assembly, the channel-shaped inside jacket is fitted within the channel-shaped outside jacket and held in position in relation to each other. Then, insulation in the form of polystyrene blocks is placed and voids are filled with foamed-in-place polyurethane. As it will be understood, such a construction is associated with a number of drawbacks as mentioned above, e.g. that the construction and setting up has to be made at the actual site, that the setting up is labour intensive and that the setting up requires that the actual space, e.g. a production area, is not usable for a considerable time while the setting up is performed.

Thus, there is a need for an improved design of such freezer constructions, freezer houses, freezer tunnels. etc.

Furthermore, there is a need for providing such an improved design and construction, whereby the time used for setting up the construction is reduced.

Even further, there is a need for such an improved design and construction, whereby the requirements as regards special skills of the workers setting up or erecting the construction are reduced.

Furthermore, there is a need for such an improved design and construction, whereby the setting up, erecting, etc. is facilitated, such that quality standards are fulfilled, e.g. including that a satisfactory evenness of the floor in the construction is ensured, that connections, welding seams, etc. have a good finish and quality, and that an intact insulation of the construction is ensured.

These and other objects are achieved by the invention as explained in further detail in the following.

SUMMARY OF THE INVENTION

The invention relates to a modular element for a thermally insulated construction such as a freezer construction or a heated construction, said modular element being a thermally insulated structural element comprising an inner cladding, an outer cladding and an insulating layer located between the inner cladding and the outer cladding, wherein said modular element is configured with the insulating layer placed adjacent to the inner cladding prior to assembly of said modular element in a modular construction and wherein the inner cladding of said modular element is adapted to be joined to an inner cladding of said modular construction along at least a substantial part of at least one edge with the insulating layer of the modular element intact.

Hereby, it is achieved that a thermally insulated construction such as a freezer construction or a heated construction can be made by using modular elements that can be prefabricated elements, which can be delivered to the actual site, e.g. a production area, and assembled here. Thus, a considerable part of the manufacturing has been made in advance, meaning that the time necessary at the production area is reduced, whereby downtime is reduced. Further, the negative effects on production in areas close to the actual erection site are minimized as well. Even further, it is achieved that the work that has to be done at the actual erection site, e.g. a production area, can be made in a manner that optimizes the resulting quality. Since the inner cladding of the modular element is adapted to be joined to an inner cladding of said modular construction, e.g. to a similar modular element, along one edge of the inner cladding, an efficient connection and construction process is provided. Further, since this connection of the modular elements are made along at least a substantial part of at least one edge and without interfering with the insulating layer, a construction having an optimal and homogeneous insulating efficiency is provided. Even further, it is noted that since the modular elements can be prefabricated elements, these can be made to specified standards under optimal conditions, meaning that for example floor elements having a desired flatness of the bottom part can be produced and delivered to the building site.

The joining of the inner cladding of the modular element to the inner cladding of said modular construction along at least a substantial part of at least one edge is made with the insulating layer of the modular element intact, which comprises that e.g. the insulating layer is essentially undamaged by the joining process, that the insulating layer is maintained essentially as placed during a prefabrication process, that the insulating layer is not damaged, e.g. melted, or adapted in any destroying manner, etc.

In an embodiment of the invention, the inner cladding of said modular element is made of metal, preferably steel, and in a more preferable form stainless steel.

Hereby, a thermally insulated construction can be provided, which has an inner surface, which can be adapted to fulfil particular requirements, e.g. in connection with thermally insulated constructions for use in connection with handling, processing and/or storing of foodstuff and the like.

In an embodiment of the invention, the inner cladding of said modular element is adapted to be joined to said inner cladding of said modular construction by a thermal process such as welding.

Hereby, a thermally insulated construction can be provided, which can be made to fulfil requirements as regards tightness, e.g. water-tightness, whereby it can be avoided that water, and/or product residues may contact the insulating material, which otherwise would represent a risk of resulting undesired growth of bacteria or growth of other undesired matter. Possibly, the thermally insulated construction may be provided as an essentially closed and tight unit in this manner. Furthermore, the cleaning procedure and subsequent drying of the thermally insulated construction is thereby simplified.

In an embodiment of the invention, the insulating layer placed adjacent to the inner cladding of the modular element is an insulation foam material that has been molded directly on at least a part of the inner cladding.

Hereby, the modular element can be made in an efficient manner and whereby optimal insulating characteristics can be achieved.

In an embodiment of the invention, the outer cladding is placed adjacent to the insulating layer prior to assembly of the modular construction, e.g. with the insulating layer being an insulation foam material that has been molded directly on at least a part of the outer cladding.

Hereby, the modular element can be made in an efficient manner and whereby optimal insulating characteristics can be achieved.

In an embodiment of the invention, the inner cladding as well as the outer cladding may be placed adjacent to the insulating layer prior to assembly of the modular construction, e.g. with the insulating layer being an insulation foam material that has been molded directly on at least a part of the inner and/or the outer cladding. Hereby, the modular element can be made in an efficient manner and whereby optimal insulating characteristics can be achieved.

As mentioned, the insulation layer may be an insulation foam material that has been moulded on at least part of the cladding. According to further embodiments, the insulation layer may be applied in various other manners during a prefabrication process, e.g. by applying an adhesive, by other fastening means, etc., such that it is achieved that the inner cladding and/or the outer cladding is/are in essentially direct contact with the insulating layer.

In an embodiment of the invention, the modular element is a floor element,
a wall element,
a corner element or
a ceiling element.

Hereby, it is achieved that a thermally insulated construction can be designed, built and erected using a limited number of e.g. standardized modular elements that in total makes up the construction and that all provide the advantageous effects of the invention concerning e.g. the relatively uncomplicated and time-efficient assembly while still providing a high quality as regards e.g. insulating features, tightness, etc.

The respective modular elements may be provided as standard elements with various standard dimensions and/or they can be provided in dimensions adapted for particular orders, constructions, etc.

In an embodiment of the invention, the modular element has a joining edge part along at least a part of the periphery of the inner cladding of the modular element, said joining edge part being formed to project away from a basis plane of the inner cladding, e.g. away from the side of the inner cladding having the insulating layer.

Hereby, it is achieved that the joining of the edge parts of two modular elements can be done relatively easily, e.g. by temporarily clamping the joining edge parts together and subsequently connecting these, e.g. by welding, in particular by seam welding. Further, as the joining edge part are formed to project away from a basis plane and thus also away from the insulating material, the insulating material will not be damaged by e.g. heat from a welding process. It is also noted that as the joining edge parts project away from a basis plane of the inner cladding, the cleaning of these parts is facilitated.

In an embodiment of the invention, the inner cladding of said modular element, when having parts being angled in relation to each other, is configured with a rounded shape between such parts, e.g. having a concave corner with a radius of curvature being e.g. 5 to 30 mm or more.

Hereby, it is achieved that the inner surfaces of the modular element and the thermally insulated construction are easily cleanable, which in particular in connection with handling, processing and/or storing of food products, food product material or the like is of vital importance, but which also in other fields is of great importance.

In an embodiment of the invention, the inner cladding of said modular element may, when formed as a wall element, have a lower part that is offset in an inwards direction and where furthermore a rear component is placed at the rear side of the inner cladding, said rear component having a protective part for providing a distance d1 between the insulating layer and the inner cladding at least at a lower edge of the inner cladding.

Hereby, it is achieved that the lower edge of the inner cladding of the wall element can be connected to the inner cladding of e.g. a floor element by e.g. welding without the heat from the welding destroying, e.g. melting, or harming the insulating layer that is placed adjacent to the inner cladding on the rear side of this.

In an embodiment of the invention, the rear component may furthermore comprise a perpendicular part and a rear edge that may be bent, which are embedded in the insulating layer, e.g. in a foam insulating material.

Hereby, it is achieved that the rear component in addition to keeping the insulating material a distance away from a connection location, where welding or another heat producing process has to be performed, it can also serve to hold or fix the layer of insulating material to the rear side of the modular element, e.g. due to the "hook"-shaped form of the perpendicular part and the rear edge of this.

In an embodiment of the invention, the modular element, which is configured as a wall element, may be adapted to be connected to a floor element, e.g. with the inner cladding of the wall element being adapted to be connected, e.g. by welding, to the inner cladding of the floor element.

In an embodiment of the invention, the modular element is formed as a floor element and the inner cladding of said floor element and/or the outer cladding of said floor element may be formed to provide an upright wall part.

Hereby, it is achieved that the floor element on its own or together with other floor elements can serve as a bottom tray, e.g. with wall parts extending upwards from one or more of the sides. In this manner, a bottom tray can be provided that is improved as regards tightness, insulating characteristics, ease of cleaning, etc.

The outer cladding may be plate material made from e.g. steel, stainless steel, painted steel, plastic or other suitable materials.

In a second aspect of the invention, a thermally insulated construction is provided such as a freezer construction or a heated construction, said thermally insulated construction being e.g. a freezer tunnel, a freezer housing, a cooling tunnel, a heating tunnel, etc., said thermally insulated construction being adapted for an industrial process, for example for processing of foodstuff or the like, characterized in that said thermally insulated construction comprises modular elements according to any one of claims 1-12.

Hereby, it is achieved that such a thermally insulated construction such as a freezer construction or a heated construction can be made by using modular elements that can be prefabricated elements, which can be delivered to the actual site, e.g. a production area, and assembled here. Thus, a considerable part of the manufacturing has been made in advance, meaning that the time necessary at the production area is reduced, whereby production downtime is reduced. Further, the negative effects on production in areas close to the actual erection site are minimized as well. Even further, it is achieved that the work that has to be done at the actual erection site, e.g. a production area, can be made in a manner that optimizes the resulting quality. Since the modular elements are adapted to be joined to by the inner cladding to an inner cladding of said modular construction, e.g. to a similar modular element, along one edge of the inner cladding, an efficient connection and construction process is provided. Further, since this connection of the modular elements are made along at least a substantial part of at least one edge and without interfering with the insulating layer, a construction having an optimal and homogeneous insulating efficiency is provided.

In an embodiment of the invention, at least two modular elements have been assembled and joined along at least part of abutting edge parts, said abutting edge parts comprising joining edge parts.

Hereby, it is achieved that the joining of the edge parts of two modular elements can be done relatively easily, e.g. by temporarily clamping the joining edge parts together and subsequently connecting these, e.g. by welding, in particular by seam welding from the inner side of the construction. The welding may for example be performed as a butt joint weld and/or as an overlap welding.

When building such a thermally insulated construction according to the invention, the joining edge parts may be clamped together, e.g. by a welding clamp, the joining edge parts may be spot-welded together, whereafter the welding clamp can be removed, and finally the joining edge parts can be seam-welded to form a tight construction. The welding may for example be performed as a butt joint weld and/or as an overlap welding. Other manners of joining these modular elements together are possible, which will be apparent to a skilled person.

THE FIGURES

Figure 3:
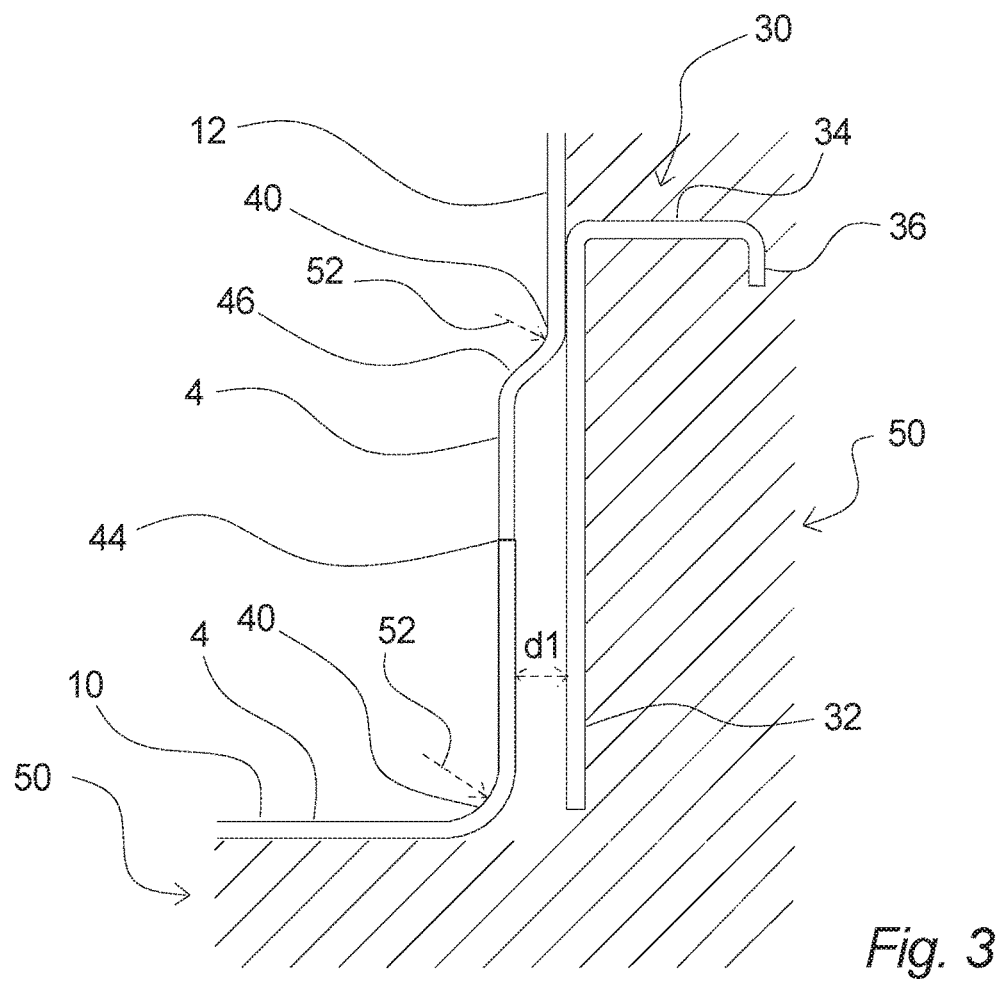
Figure 2:
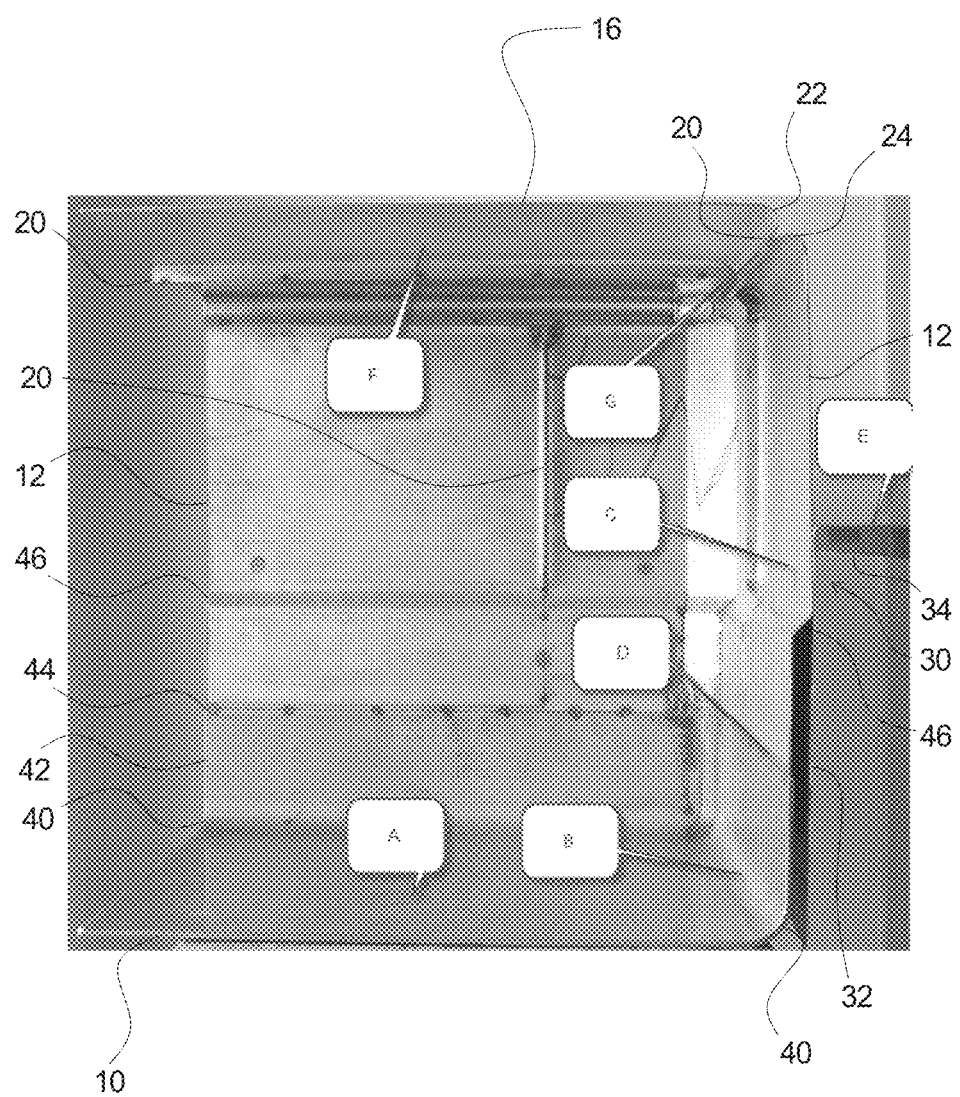
Figure 4:
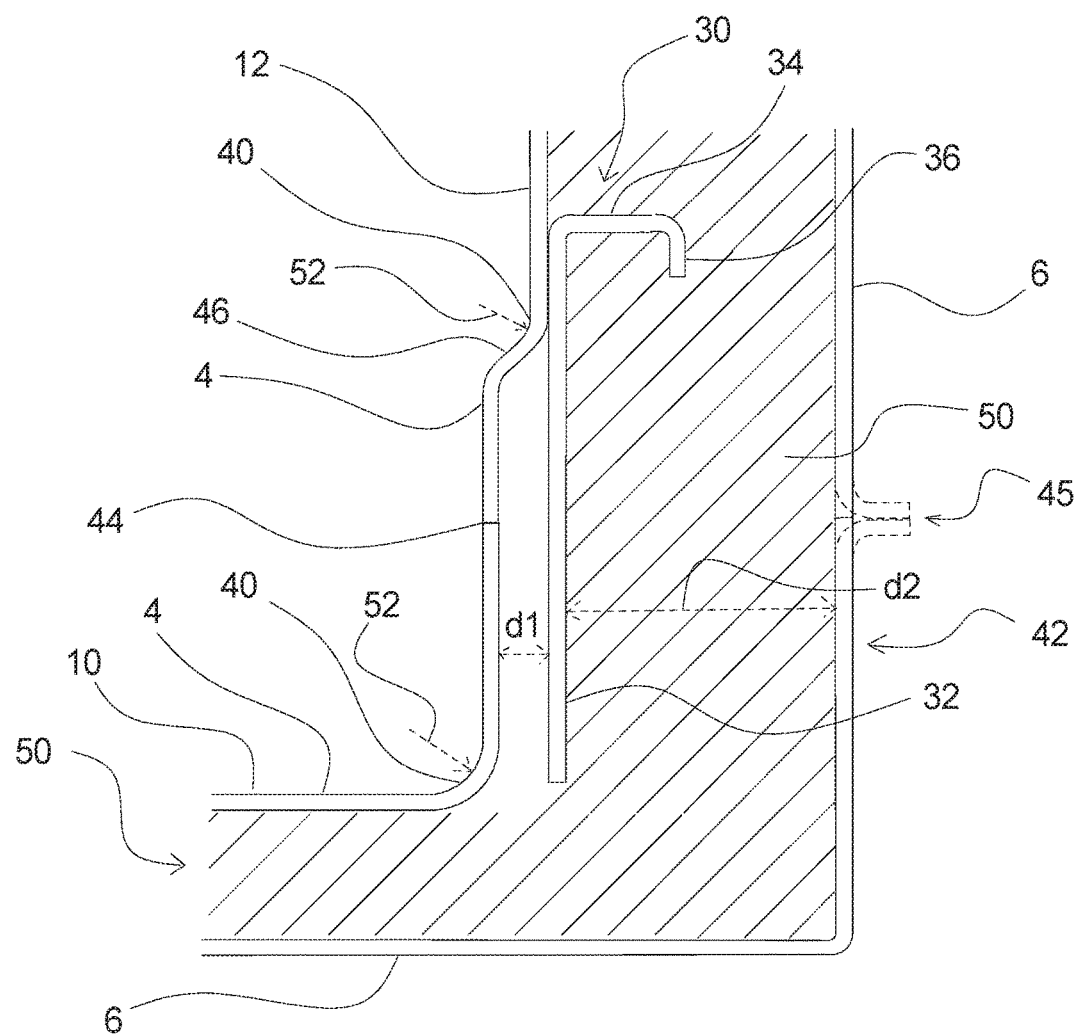
Figure 5:
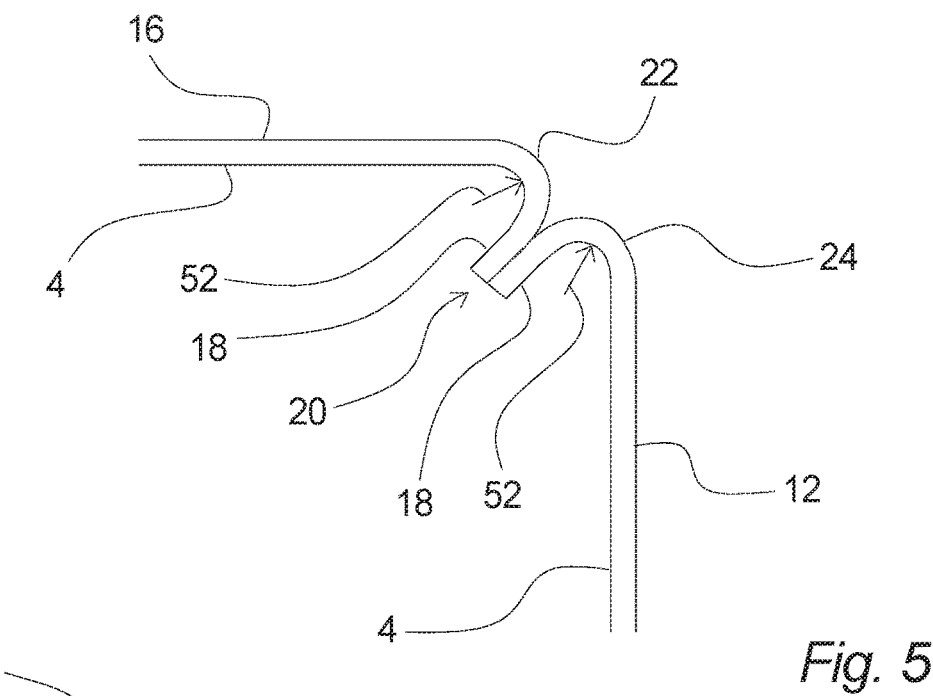
Figure 6:
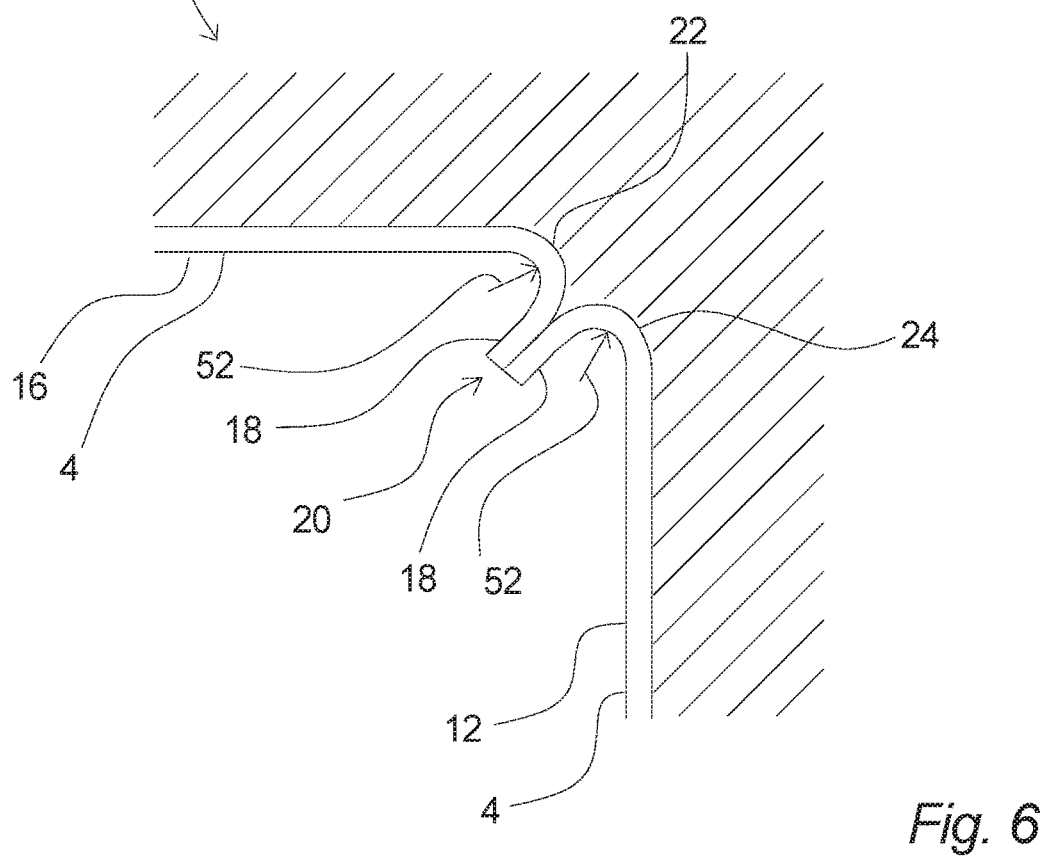
Figure 7:
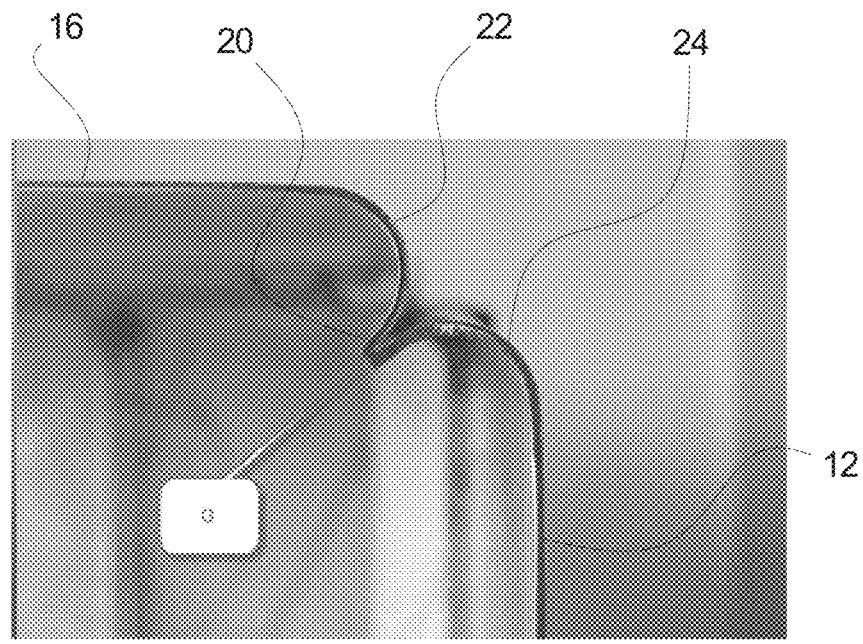
Figure 8:
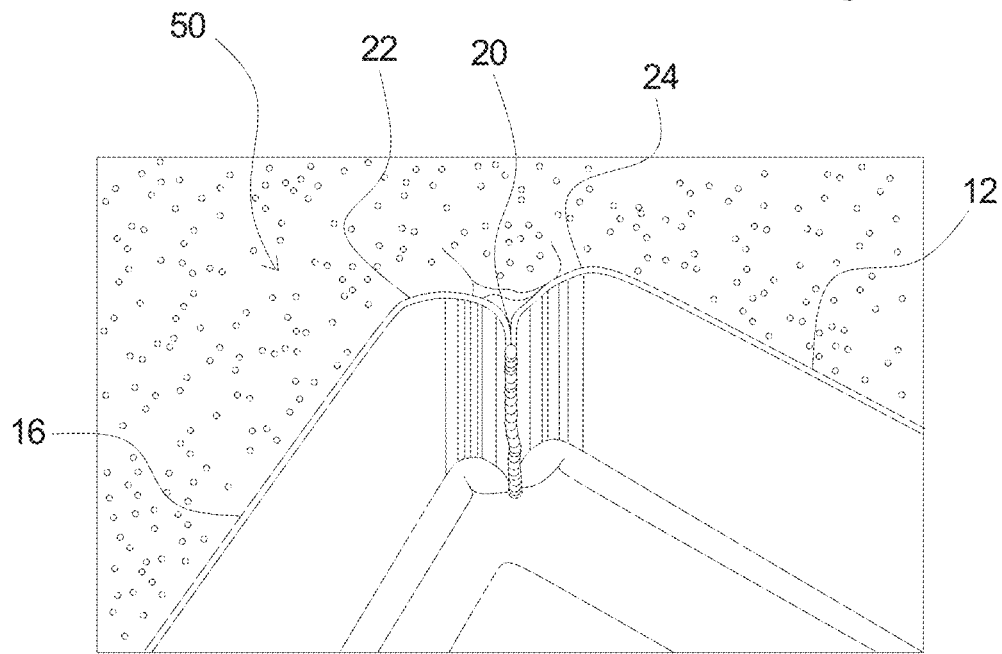
Figure 9:
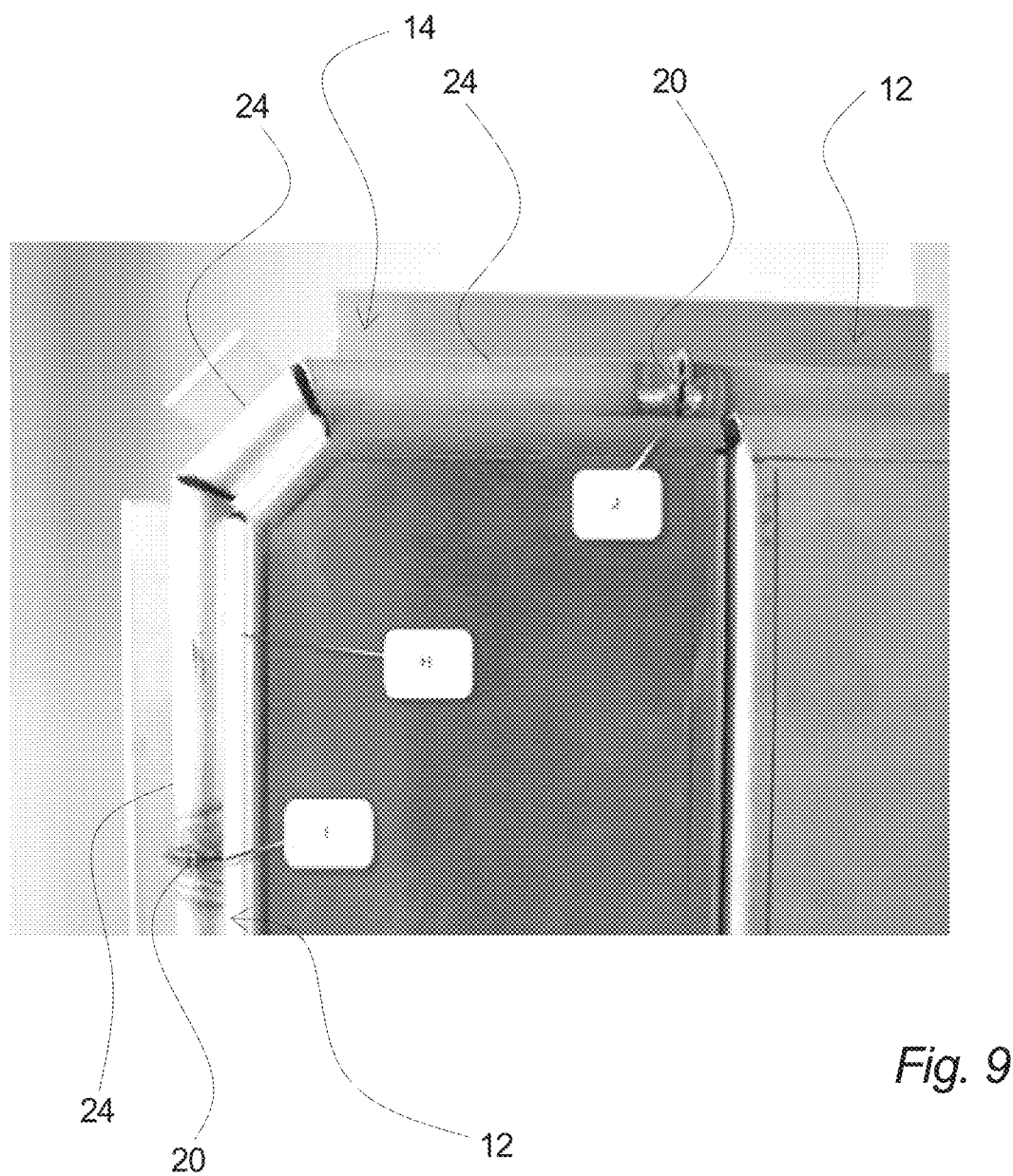
Figure 10:
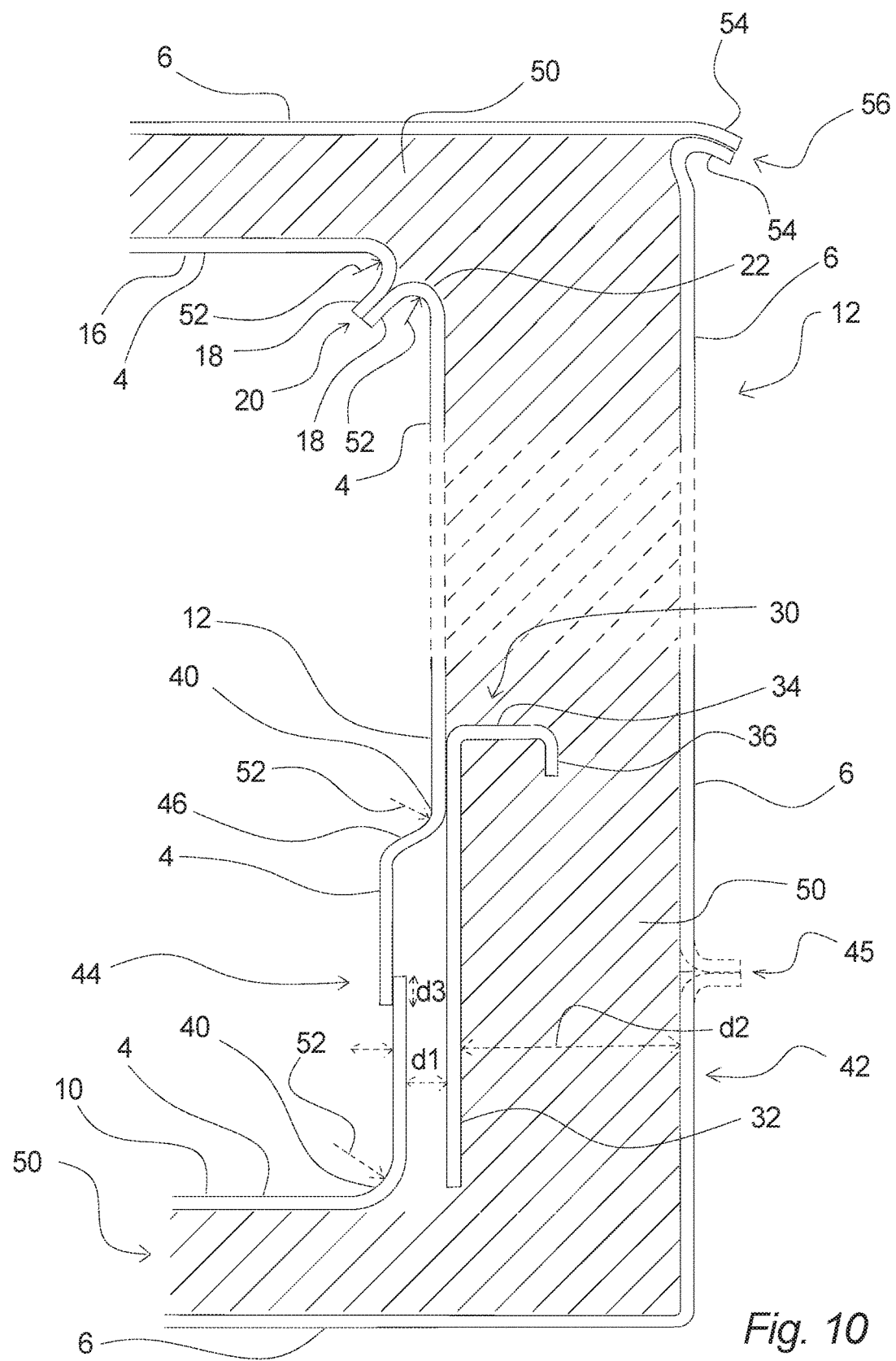

The invention will be explained in further detail below with reference to the figures of which FIG. 1 shows in a perspective view an example of an embodiment of a thermally insulated construction made from modular elements in accordance with the invention, FIG. 2 shows a cut-out part of an exemplary construction, built from modular elements according to an embodiment of the invention, FIG. 3 is an enhanced and enlarged sectional view of a part of a floor element connected to a wall element, FIG. 4 corresponds to FIG. 3, but furthermore shown with an outer cladding placed on the outer side of the insulating layer, FIGS. 5 and 6 show enhanced and enlarged sectional views of a part of connected edge parts between modular elements according to an embodiment of the invention, FIGS. 7 and 8 show sectional views of connected edge parts between modular elements, essentially corresponding to FIGS. 5 and 6, FIG. 9 shows an example embodiment of a corner element, seen in a top view together with adjacent parts of two wall elements, and FIG. 10 shows a further exemplary embodiment of the invention.

DETAILED DESCRIPTION

An example of a thermally insulated construction 1 made from modular elements in accordance with the invention is shown in a schematic manner and in a perspective view in FIG. 1. The construction 1 can be made essentially entirely or only partly of modular elements, e.g. since the construction may comprise other elements such as doors, hatches, or the like, which may not be modular elements. Other special elements may be used as well. However, normally at least a major part of the construction will be made of modular elements. In FIG. 1, the construction 1 may be a freezer house or the like having an elongated and closed form. It will be understood that it may have e.g. openings at the ends, for example in case it is configured as a cooler or freezer tunnel or the like. Other configurations are possible, which will be apparent to a person skilled within the field. Also, use as a heated construction is possible.

In the schematic example shown in FIG. 1, where the modular elements are indicated by punctuated lines, a plurality of modular floor elements 10 are used. These may extend from one side of the construction 1 to the other and have an upright wall part. In the example shown, six such floor elements 10 are used, where one at each end has upright wall parts along three edges, while the rest, i.e. the floor elements between the end floor elements, only have upright wall parts along two opposite edges. Thus, when these six floor elements 10 have been assembled, e.g. by welding at the abutting edges, a bottom tray is provided, as it will be explained in further detail below. As it also will be explained further below, the floor elements 10 will be provided as prefabricated elements that are thermally insulated.

Further, it is indicated in FIG. 1 that the walls of the construction 1 is made by use of a plurality of wall elements 12 and four corner elements 14. As shown, one wall element 12 together with two corner elements 14 may be sufficient for an end of the construction 1, but more than one wall element 12 may be used at each end, depending on the width of the construction 1 and the dimension of the modular wall elements 12. The same reasoning applies as regards the number of modular wall elements 12 that has to be used for a side wall of the construction 1, i.e. the number of wall elements depends on the length of the construction 1 and the dimension of the modular wall elements 12 as well as the dimension of the corner elements 14.

Also, it is indicated in FIG. 1 that the top or ceiling of the construction 1 is made by use of modular ceiling elements 16, e.g. four ceiling elements 16 as shown in the example, but it will be apparent that the number of ceiling elements depends on the length and possibly also the width of the construction 1 and the dimension of the modular ceiling elements 12.

As shown in FIG. 1, the ceiling elements 16 may have a dimension in the longitudinal direction of the construction 1 that is different from the dimension of the wall element 12 in the longitudinal direction of the construction 1, but it is apparent to a skilled person that they may be essentially identical. This may depend on the actual dimensions of the construction 1 and the actual dimensions of the various modular elements that can be provided. It will be understood that the modular elements may be produced in any suitable dimensions, depending on the actual use and requirements, and that such actual dimensions are not important for the invention as specified in the claims.

As mentioned, the modular elements are in general prefabricated and thermally insulated. Further, as it will be explained in the following, they are configured in such a manner that the assembly of the modular elements is facilitated.

In FIG. 2 is shown a cut-out part of an exemplary construction, built from modular elements, although without insulating layer and without the outer cladding. This example is seen from the inside with the floor element 10, the wall elements 12 and the ceiling element 16 for example being cut through to show the inner parts. As shown here, the floor element 10 has upright wall parts 42, which together with the horizontal floor part form a bottom tray A. The upright wall parts 42 meet the respective modular elements above the floor element 10, e.g. wall parts 12 and a corner element 14, where a connection 44 between the inner cladding of the floor element 10 and the other modular elements are made. In case the inner cladding is steel, e.g. stainless steel, the connection is preferably a welded connection D such as e.g. a seam welding to provide a tight connection. It is noted that FIG. 2 shows a spot welding, which may also be used in certain circumstances.

Further, as shown in FIG. 2, the bottom tray has (at B) between the floor part and the upright wall parts 42 a rounded shape 44 in order to facilitate cleaning of the inner cladding.

Furthermore, as shown in FIG. 2, the inner cladding of the respective elements such as wall elements 12, corner elements 14 and ceiling elements 16 are mutually connected by connected edge parts 20, which will be further explained below, but where such joining edge parts are formed to project away from the basis plane of the inner cladding, e.g. in a direction away from the side of the inner cladding, which has the insulating layer on its outer side, and into the inner of the construction 1. These joining edge parts can then be connected to each other by welding (e.g. as shown at G showing a welded connection between the inner cladding of a ceiling element F and a wall element C). As shown in FIG. 2 at the connected edge parts 20 between the ceiling element 16 and the wall element 12, this connection is made by means of an edge of the modular ceiling element, which is bent inwards while simultaneously providing a rounding 22 at the joining edge part. In a similar fashion, an edge of the modular wall element has been bent inwards while simultaneously providing a rounding 24 at the joining edge part. As mentioned, the modular elements are prefabricated elements and these bent and rounded edge parts can be made as part of the prefabrication, so that the modular elements are delivered to the building site, ready to be connected to each other, e.g. by welding of the joining edge parts, when placed abutting each other, to form the connected edge parts 20. Since the edge parts are rounded 22, 24, the cleaning of the inner walls of the construction 1 is facilitated, meaning that an effective cleaning can be performed since there are no sharp corners, small openings, etc. where moist, food material, etc., can accumulate.

The design of a wall element 12 according to an embodiment of the invention is also indicated in FIG. 2, where it is shown that the inner cladding (C) is formed with an offset bend 46, which has the effect that the upper part of the inner cladding is shifted outwards by a distance as compared with the lower part of the inner cladding. Furthermore, on the rear side of the inner cladding a rear component 30 is placed (E), connected to the wall element 12. This rear component 30, which may be a component made of plate, extending essentially along the length of the wall element, may as shown have a protective part 32, which extends in the vertical direction and provides a small distance to the lower part of the inner cladding, and a perpendicular part 34, which extends essentially perpendicular to the protective part 32. As it will explained below in connection with e.g. FIG. 3, this rear component 30 will be embedded in the insulating layer (not shown in FIG. 2) and serve to maintain a distance between the connection 44 and the insulating layer.

FIG. 3 shows in an enhanced view a part of a floor element 10 connected to a wall element 12, where the inner cladding 4 of the floor element 10 is connected to the inner cladding 4 of the wall element 12 and where the wall element 12 has a rear component 30 as mentioned above in connection with FIG. 2. As shown in FIG. 3, the floor element is provided as an e.g. prefabricated modular element with a layer of insulating material 50, e.g. a foam layer, which may be attached to the rear of the inner cladding 4, for example moulded onto this. Similar regards the modular wall element 12, which also is provided as an e.g. prefabricated modular element with a layer of insulating material 50, which may be attached at the rear of the inner cladding 4, for example by moulding. Also, the rear component 30 is embedded in the layer of insulating material 50 in the manner that the insulating material is kept behind the essentially vertical protective part 32. Thus, the insulating material is kept a small distance d1 away from the connection 44 between the inner cladding of the floor element and the inner cladding of the wall element. In this manner it is prevented that the insulating material, e.g. a foam material, is destroyed by the heat from a welding process used for making the connection 44. The distance d1 may for example be in a range of 5-8 mm, but other values, larger or smaller, may be used as well. It is noted that in FIG. 3 the connection 44 is indicated as being a butt-welded connection, but it may be any other type, e.g. an overlap welding, etc. In case of overlap welding, the overlap may for example be 20 mm, but it will be understood that the overlap may be smaller or larger.

As furthermore shown in FIG. 3, the perpendicular part 34 of the rear component 30 is bent downwards at the edge to provide a relatively small rear edge 36 that may be essentially parallel with the protective part 32. Even further, it is noted that the perpendicular part 34 and the relatively small rear edge 36 are also embedded in the layer of insulating material 50, where the "hook"-shaped form due to the rear edge 36 may serve to hold or fix the insulating material to the rear side of the wall element.

In FIG. 3 it is also indicated that bent parts of the inner cladding 4 is made as rounded parts, e.g. between the floor part and the upright part of the floor element 10 and at the offset bend 46 at the wall element 12. Here, it is shown that the rounded parts are made with a radius of curvature 52, which according to an embodiment of the invention is in the range of e.g. 5 mm to 30 mm or larger. Thus, the cleaning of the inner parts, e.g. floor, bottom tray, walls, ceilings, etc. of the construction 1 is facilitated, meaning that an effective cleaning can be performed since there are no sharp corners, small openings, etc. where moist, food material, etc., can accumulate.

FIG. 4 shows in an enhanced sectional view a part of a floor element 10 connected to a wall element 12, corresponding to FIG. 3, but where furthermore it is shown that an outer cladding 6 is placed on the outer side of the insulating layer 50. Thus, at the floor element the outer cladding is placed below the insulating layer 50 and extending up vertically at the side to form the outer cladding of the upright part 42 of the bottom tray. In this example of an embodiment, the outer cladding of the floor element 10 reaches essentially to the same height as the inner cladding, e.g. the same height as the connection 44. However, the outer cladding 6 of the floor element 10 may instead of being connected by e.g. a butt-welding, an overlap welding or the like be connected to the outer cladding of the wall element 12 at an outer cladding connection 45, where edge parts of the two pieces of outer cladding have been bent outwards, e.g. in connection with the prefabrication process, to form edge parts that can easily be e.g. clamped temporarily together and welded, e.g. spot or seam-welded. Thus, the building process involving finishing the outer cladding is hereby made easier and more efficient than in the prior art. Further, since the welding spot or seam is removed outwards, the risk of damage to the insulating layer 50, which may be foam insulation material, is reduced considerably and can be completely avoided.

As it has been explained above in connection with FIG. 3, the perpendicular part 34 of the rear component 30 is bent downwards at the edge to provide a relatively small rear edge 36 that may be essentially parallel with the protective part 32. In FIG. 4 it is in the same manner shown that the perpendicular part 34 and the relatively small rear edge 36 are embedded in the layer of insulating material 50, where the "hook"-shaped form due to the rear edge 36 may serve to hold or fix the insulating material to the rear side of the wall element. Also, it is shown here that the length of the perpendicular part 34 is smaller than the dimension, e.g. the indicated thickness d2 of the insulating layer 50 in the wall element 12. For example, the length of the perpendicular part 34 may be about half the dimension d2 or less. Thus, in this manner it is ensured that the wall element 12 serves to provide an efficient thermal insulation without any unfavourable thermal bridges, etc.

FIGS. 5 and 6 show enhanced sectional views of a part of the connected edge parts 20 between modular elements according to an embodiment of the invention, which modular elements may for example be a ceiling element 16 and a wall element 12. As mentioned above, this connection is made by means of an edge of the modular ceiling element, which is bent inwards while simultaneously providing a rounding 22 at the joining edge part. In a similar fashion, an edge of the modular wall element has been bent inwards while simultaneously providing a rounding 24 at the joining edge part. As the modular elements can be prefabricated elements, these bent and rounded edge parts can be made as part of the prefabrication, so that the modular elements are delivered to the building site, ready to be connected to each other, e.g. by welding of the joining edge parts to form the connected edge parts 20. The edge parts are rounded 22, 24 with a radius or curvature being in the range of e.g. 5 mm to 30 mm, possibly more. In this manner, the cleaning of the inner walls of the construction 1 is facilitated, meaning that an effective cleaning can be performed since there are no sharp corners, small openings, etc. where moist, food material, etc., can accumulate.

The part of the connected edge parts 20 between modular elements shown in FIG. 6 corresponds to FIG. 5, but furthermore it is shown in FIG. 6 that an insulating layer 50, e.g. moulded foam material, is placed on the outer side of the inner cladding of elements 16 and 12. This insulating layer 50 may have been placed on the elements during the prefabrication, e.g. moulded on the elements, for example in a manner such that when the two elements are connected to each other, the insulating layers from each of the elements will together form a complete insulating layer, e.g. because they may be abutting each other. As it will be seen from FIG. 6, due to the form of the connected edge parts 20 with the edge parts from each element being bent inwards, it can be prevented that the insulating material, e.g. a foam material, is destroyed by the heat from a welding process used for connecting the edge parts to make the connection 20.

In FIGS. 5 and 6 are shown connected edge parts 20 between modular elements according to an embodiment of the invention, where the modular elements may for example be a ceiling element 16 and a wall element 12. It will be apparent that connections between e.g. two wall elements 12, a wall element 12 and a corner element 14, two ceiling elements 16, etc. may be made in essentially the same manner, e.g. as shown in FIG. 2, where a vertical connection 20 between a wall element 12 and a corner element 14 is shown. It will be understood that in such cases, the rounding at the joining edge parts will be correspondingly smaller, e.g. in order to achieve that the edge parts will be abutting each other.

FIGS. 7 and 8 show sectional views of connected edge parts 20 between modular elements, essentially corresponding to FIGS. 5 and 6, and with welded connections (G) having been made. In FIG. 8 an insulating layer 50 in the form of insulation foam has been applied.

In FIG. 9 a corner element 14 is shown (H), seen in a top view together with adjacent parts of two wall elements 12. For clarity, only parts in top of the view are identified in the figure and an insulating layer is not shown here. However, it is clear that the corner element 14, which in this example has a form essentially corresponding to a 90° corner, although the corner is "cut" by a small wall part, is formed in a vertical section in the essentially same manner as a wall element 12, such as shown in e.g. FIGS. 2, 3 and 4. Thus, this also includes that the corner element 14 is formed at the top in the same manner as shown for a wall element 2 in FIG. 5, e.g. with the top formed with a rounded edge part 24 that is shaped to meet with a rounded part 22 on a ceiling element 16. This is indicated in FIG. 9, where the corner element 14 is connected to two adjacent wall elements 12 by means of connected edge parts 20, e.g. welded connections (I, J). Thus, it will be understood that a modular ceiling element 16, which has a corresponding form and which also has bended and rounded joining edge parts, can be placed on top of the elements shown in FIG. 9 and the joining edge parts can be connected to each other from within the construction, for example by temporarily clamping the joining edge parts together and welding the parts together, e.g. by seam welding.

In FIG. 10 is shown a further exemplary embodiment of the invention in a sectional view, where the lower part of FIG. 10 essentially corresponds to FIG. 4, but with a modification as it will be explained in the following. Thus, in the lower part of FIG. 10 is shown a part of a floor element 10 connected to a wall element 12, where it is shown that an outer cladding 6 is placed on the outer side of the insulating layer 50 of the wall element 12 and that at the floor element the outer cladding is placed below the insulating layer 50 and extending up vertically at the side to form the outer cladding of the upright part 42 of the bottom tray. Further, as in connection with FIG. 4, it is shown that the outer cladding 6 of the floor element 10 is connected to the outer cladding of the wall element 12 at an outer cladding connection 45, where edge parts of the two pieces of outer cladding have been bent outwards, e.g. in connection with the prefabrication process, to form edge parts that can easily be e.g. clamped temporarily together and welded, e.g. spot or seam-welded. The modification as compared to the embodiment shown in FIG. 4 relates to the connection 44 between the inner cladding 4 of the floor element 10 and the inner cladding 4 of the wall element 12, which here is shown as being an overlap welding, e.g. preferably with the inner cladding 4 of the wall element 12 overlapping on the inner side as shown in FIG. 10, e.g. in order to prevent moist etc. from being collected at the overlap connection. As previously explained, by this construction it is prevented that the insulating material, e.g. a foam material, in the insulating layer 50 is destroyed by the heat from a welding process used for making the connection 44. Also, it is noted that the distance d1 may for example be in a range of 5-8 mm, but other values, larger or smaller, may be used as well. It is also noted that the overlap d3 between the overlapping inner claddings 4 may for example be 20 mm, but it will be understood that the overlap may be smaller or larger.

Also in FIG. 10 the upper part of a wall element 12 is shown, where for the sake of clarity it is indicated by dash-lines that the actual height of the wall element 12 may be larger (or considerably larger) than the dimension in the vertical direction of the drawing.

The upper part of FIG. 10 thus shows a construction comprising a ceiling element 16 and a wall element 12 connected together with the inner claddings 4 of these essentially being connected together as shown in FIGS. 5 and 6 and as described in connection with these figures, e.g. with joining edge parts 18 being connected together, e.g. by welding, to form connected edge parts 20. Also, it is shown that both the ceiling element 16 and the wall element 12 has an insulating layer 50, which essentially meets to form a complete insulating layer also at the region where the two modular elements meet. Further, it is shown that both the ceiling element 16 and the wall element 12 has an outer cladding 6, which are connected together at the upper edge, e.g. by having the outer cladding 6 of the ceiling element 16 extending outwards in a slightly downwards curvature to form a joining edge part 54 and by having the outer cladding 6 of the wall element 12 being formed to have a rounded outwards curving shape as shown in FIG. 10 to end in a joining edge part 54 that is essentially parallel with the joining edge part 54 of the outer cladding 6 of the ceiling element 16. These two joining edge parts 54 can be connected to each other to form an outer cladding connection 56 between wall and ceiling element, e.g. by welding these together, for example by seam welding.

In the above description, various embodiments of the invention have been described with reference to the drawings, but it is apparent for a person skilled within the art that the invention can be carried out in an infinite number of ways, using e.g. the examples disclosed in the description in various combinations, and within a wide range of variations within the scope of the appended claims.

LIST OF REFERENCE NUMBERS

1 Thermally insulated construction
2 Modular element
4 Inner cladding
6 Outer cladding
10 Floor element
12 Wall element
14 Corner element
16 Ceiling element
18 Joining edge part
20 Connected edge parts
22 Rounding at joining edge part of modular ceiling element
24 Rounding at joining edge part of modular wall element
30 Rear component at wall element 12
32 Protective part of rear component 30
34 Perpendicular part of rear component 30
36 Rear edge at rear component 30
40 Rounded shape
42 Upright wall part at floor element
44 Connection between floor element and another modular element
45 Outer cladding connection
46 Offset bend
50 Insulating layer
52 Radius of curvature
54 Joining edge part at outer cladding
56 Outer cladding connection between wall and ceiling element
A Bottom tray
B Curvature at bottom tray
C Inner cladding of wall element
D Welded connection between bottom tray and wall element
E Rear component at wall element
F Inner cladding of ceiling element
G Welded connection between inner cladding of ceiling element and wall element
H Corner element
I, J Welded connections between corner element and wall element
d1 Distance between insulating layer and welding location
d2 Dimension of insulating layer in wall element
d3 Dimension of overlap

The invention claimed is:

1. A modular element for a thermally insulated construction such as a freezer construction or a heated construction, said modular element being a thermally insulated structural element comprising:
an inner cladding,
an outer cladding, and
an insulating layer located between the inner cladding and the outer cladding, wherein said modular element is configured with the insulating layer placed adjacent to the inner cladding prior to assembly of said modular element in a modular construction and wherein the inner cladding of said modular element is adapted to be joined to an inner cladding of said modular construction along at least a substantial part of at least one edge with the insulating layer of the modular element intact, wherein the inner cladding of said modular element is made of metal and wherein the inner cladding of said modular element is adapted to be joined to said inner cladding of said modular construction by welding, wherein the inner cladding of said modular element is formed as a wall element and has a lower part that is offset in an inwards direction and where furthermore a rear component is placed at a rear side of the inner cladding, said rear component having a protective part for providing a distance d1 between the insulating layer and the inner cladding at least at a lower edge of the inner cladding, and wherein said rear component furthermore comprises a perpendicular part and a rear edge, which are embedded in the insulating layer.

2. The modular element according to claim 1, wherein the inner cladding of said modular element is made of steel.

3. The modular element according to claim 1, wherein the insulating layer placed adjacent to the inner cladding of the modular element is an insulation foam material that has been molded directly on at least a part of the inner cladding.

4. The modular element according to claim 1, wherein the outer cladding is placed adjacent to the insulating layer prior to assembly of the modular construction, with the insulating layer being an insulation foam material that has been molded directly on at least a part of the outer cladding.

5. The modular element according to claim 1, wherein said modular element is:
a floor element,
a wall element,
a corner element, or
a ceiling element.

6. The modular element according to claim 5, wherein said modular element has a joining edge part along at least a part of the periphery of the inner cladding of the modular element, said joining edge part being formed to project away from a basis plane of the inner cladding and away from the side of the inner cladding having the insulating layer.

7. The modular element according to claim 1, wherein the inner cladding of said modular element has parts being angled in relation to each other and is configured with a rounded shape between such parts, said rounded shape having a concave corner with a radius of curvature being 5 to 30 mm.

8. The modular element according to claim 1, wherein said modular wall element is adapted to be connected to a floor element with the inner cladding of the wall element being adapted to be connected by welding, to the inner cladding of the floor element.

9. The modular element according to claim 1, wherein the modular element is formed as a floor element and wherein the inner cladding of said floor element and/or the outer cladding of said floor element is formed to provide an upright wail part.

10. A thermally insulated construction configured as a freezer construction or a heated construction, said thermally insulated construction being one of a freezer tunnel, a freezer housing, a cooling tunnel and a heating tunnel, said thermally insulated construction being adapted for an industrial process, characterized in that said thermally insulated construction comprises modular elements according to claim 1.

11. The thermally insulated construction according to claim 10, wherein at least two modular elements have been assembled and joined along at least part of abutting edge parts, said abutting edge parts comprising joining edge parts.

12. The modular element according to claim 2, wherein the inner cladding of said modular element is made of stainless steel.

13. The thermally insulated construction according to claim 10, wherein said industrial process is a process for processing of foodstuff.

14. A modular element for a thermally insulated construction such as a freezer construction or a heated construction, said modular element being a thermally insulated structural element comprising:
an inner cladding,
an outer cladding, and
an insulating layer located between the inner cladding and the outer cladding, wherein said modular element is configured with the insulating layer placed adjacent to the inner cladding prior to assembly of said modular element in a modular construction, wherein the inner cladding of said modular element is made of metal;
a welding connection joining the inner cladding of said modular element to said inner cladding of said modular construction along at least a substantial part of at least one edge of the inner cladding of said modular element, with the insulating layer of the modular element intact; and
wherein said modular element has a joining edge part along at least a part of the periphery of the inner cladding of the modular element, said joining edge part being formed to project away from a basis plane of the inner cladding and away from the side of the inner cladding having the insulating layer.

15. The modular element according to claim 14, wherein the inner cladding of said modular element has parts being angled in relation to each other and is configured with a rounded shape between such parts, said rounded shape having a concave corner with a radius of curvature being 5 to 30 mm.

16. The modular element according to claim 14, wherein the inner cladding of said modular element, when formed as a wall element, has a lower part that is offset in an inwards direction and where furthermore a rear component is placed at the rear side of the inner cladding, said rear component having a protective part for providing a distance d1 between the insulating layer and the inner cladding at least at a lower edge of the inner cladding.

* * * * *